US006583803B2

(12) United States Patent
Poole et al.

(10) Patent No.: US 6,583,803 B2
(45) Date of Patent: Jun. 24, 2003

(54) THERMAL PRINTER WITH SACRIFICIAL MEMBER

(75) Inventors: David L. Poole, Palatine, IL (US); Barry R. Knott, Wheeling, IL (US); David Laurence George Worgan, Crewe (GB)

(73) Assignee: Zih Corporation, Wilmington, DE (US)

( * ) Notice: Subject to any disclaimer, the term of this patent is extended or adjusted under 35 U.S.C. 154(b) by 21 days.

(21) Appl. No.: 09/904,249

(22) Filed: Jul. 12, 2001

(65) Prior Publication Data

US 2002/0101499 A1 Aug. 1, 2002

Related U.S. Application Data

(60) Provisional application No. 60/266,496, filed on Feb. 5, 2001, and provisional application No. 60/264,858, filed on Jan. 29, 2001.

(51) Int. Cl.[7] ............................................ G01D 15/16

(52) U.S. Cl. .................................................... 347/213

(58) Field of Search ................................ 347/213, 215, 347/171, 175, 176, 187, 217, 219; 156/234; 101/401.2; 346/136; 400/225, 237, 223

(56) References Cited

U.S. PATENT DOCUMENTS 3,609,238 A * 9/1971 Hodel .................... 101/401.2
3,993,181 A 11/1976 Potma et al.
3,998,315 A 12/1976 Phillips
4,014,425 A 3/1977 Gijzen et al.
4,030,408 A 6/1977 Miwa
4,033,444 A 7/1977 Beery
4,044,878 A 8/1977 Kunath
4,090,600 A 5/1978 Biedermann
4,096,488 A 6/1978 Angerame
4,106,873 A 8/1978 Drejza et al.
4,114,751 A 9/1978 Nordin
4,157,554 A 6/1979 Bahr et al.
4,161,270 A 7/1979 Casey
4,180,333 A 12/1979 Linder
4,208,141 A 6/1980 Jagger
4,260,270 A 4/1981 Cavallari
4,286,274 A 8/1981 Shell et al.
4,293,232 A 10/1981 Linder
4,304,495 A 12/1981 Wada et al.
4,318,452 A 3/1982 Reitner (List continued on next page.)

FOREIGN PATENT DOCUMENTS

EP 0694410 1/1996
EP 0869008 10/1998
EP 1006000 6/2000

OTHER PUBLICATIONS

A European Search Report dated Apr. 25, 2002, which issued in connection with corresponding European patent application EP01 31 0494.
Patent abstracts of Japan vol. 010, No. 331 (—533) and JP 61 135763 A.

*Primary Examiner*—Lamson Nguyen
*Assistant Examiner*—K. Feggins
(74) *Attorney, Agent, or Firm*—Trexler, Bushnell, Giangiorgi, Blackstone & Marr, Ltd.

(57) ABSTRACT

A thermal printer that includes a thermally conductive sacrificial member disposed between the thermal print head and the web. The sacrificial member is held generally under tension and prevents the web from directly engaging the thermal print head. The sacrificial member may take one of many different forms, including a fixed strip or belt, a rotatable, continuous belt which slowly recirculates during printing to equalize wear across its surface, or a Moebius loop which further provides that wear is equalized across both sides of the belt. By providing a sacrificial member between the print head and web, wear and exposure of the print head is reduced, thereby prolonging the life of the print head.

27 Claims, 6 Drawing Sheets

U.S. PATENT DOCUMENTS 4,371,273 A 2/1983 Kendall et al.
4,379,428 A 4/1983 Schmulian
4,459,675 A 7/1984 Bateson et al.
4,474,485 A 10/1984 Sekiguchi
4,490,059 A 12/1984 Daughters
4,507,089 A 3/1985 Tchuempe-Tchuente
4,511,242 A 4/1985 Ashbee et al.
4,524,242 A 6/1985 Fish, III et al.
4,527,470 A 7/1985 Smithbauer et al.
4,549,825 A 10/1985 Fish, III et al.
4,587,400 A 5/1986 Kanamori et al.
4,625,931 A 12/1986 Tamura et al.
4,673,305 A 6/1987 Crystal
4,705,415 A 11/1987 Grombchevsky et al.
4,707,708 A 11/1987 Kitagishi et al.
4,759,649 A 7/1988 Kelly et al.
4,769,103 A 9/1988 Koike et al.
4,790,674 A 12/1988 Kleist et al.
4,867,583 A 9/1989 Caulier et al.
4,896,166 A 1/1990 Barker et al.
4,904,939 A 2/1990 Mian
4,915,517 A 4/1990 Husome
4,915,524 A 4/1990 Mitsuishi et al.
4,922,423 A 5/1990 Koomey et al.
4,933,772 A 6/1990 Ikenoue et al.
4,935,755 A 6/1990 Akutsu et al.
4,943,814 A * 7/1990 Otto .......................... 346/136
4,984,913 A 1/1991 Silverman et al.
4,990,009 A 2/1991 Stewart
5,063,116 A 11/1991 Uchida
5,067,833 A 11/1991 Gomoll et al.
5,092,695 A 3/1992 Silverman et al.
5,140,374 A 8/1992 Jagielski et al.
5,160,205 A 11/1992 Mistyurik
5,160,943 A * 11/1992 Pettigrew et al. ........... 347/215
5,168,803 A 12/1992 Kunz et al.
5,202,535 A 4/1993 Dauwen et al.
5,204,202 A 4/1993 Ishikawa et al.
5,212,884 A 5/1993 Stockli et al.
5,245,921 A 9/1993 Helinski et al.
5,255,021 A 10/1993 Noguchi et al.
5,269,506 A 12/1993 Olson et al.
5,344,242 A 9/1994 Farb
5,357,269 A 10/1994 Zeltser
5,372,439 A 12/1994 Poole et al.
5,378,504 A 1/1995 Bayard et al.
5,380,394 A * 1/1995 Shibuya et al. ............. 156/234
5,400,125 A 3/1995 Stuerzer et al.
5,411,330 A 5/1995 Arutyunov et al.
5,415,482 A 5/1995 Poole et al. ................ 400/208
5,442,382 A 8/1995 Pfeuffer
5,478,423 A 12/1995 Sassa et al.
5,507,582 A 4/1996 Mistyurik
5,574,485 A 11/1996 Anderson et al.
5,613,790 A 3/1997 Miazga ....................... 400/248
5,620,586 A 4/1997 Claessens et al.
5,688,154 A 11/1997 Goda et al.
5,690,739 A 11/1997 Sassa et al.
5,709,748 A 1/1998 Sassa et al.
5,712,676 A 1/1998 Takaki et al.
5,744,241 A 4/1998 Hobson et al.
5,798,181 A 8/1998 Hobson et al.
5,926,200 A * 7/1999 Walter ........................ 347/171
5,990,916 A * 11/1999 Fassler et al. .............. 347/171
6,001,523 A 12/1999 Kemmesat et al.
6,029,025 A 2/2000 Sakakibara et al.
6,032,008 A 2/2000 Kolodziej
6,036,382 A * 3/2000 Middleton .................. 400/225
6,057,941 A 5/2000 Furukawa et al.
6,108,499 A 8/2000 Cernusak
6,109,368 A 8/2000 Goldman et al.
6,123,473 A 9/2000 Guillen et al.
6,149,747 A 11/2000 Lorenz et al.

* cited by examiner

THERMAL PRINTER WITH SACRIFICIAL MEMBER

RELATED APPLICATIONS

This application claims the benefit of the following U.S. Provisional Application Serial No. 60/264,858, filed Jan. 29, 2001 and Serial No. 60/266,496, filed Feb. 5, 2001.

FIELD OF THE INVENTION

The present invention generally relates to thermal printers, and more specifically relates to a thermal printer which uses a sacrificial member between a print head and the web on which the printer prints in order to reduce wear on the print head during the printing process. As used throughout this application, the term "thermal printer" shall mean thermal transfer printer as well as direct thermal printer.

BACKGROUND OF THE INVENTION

Direct thermal printers are well known in the prior art. In such printers, a web of paper or film having a thermally sensitive coating is interposed between a driven platen roller and a thermal print head having a line of selectively energized heating elements. To print onto the web, an electrical pulse is applied to a selected set of the heating elements, and a localized chemical reaction occurs at corresponding points in the thermally sensitive coating on the web which results in the formation of visible dots on the web.

After a line of dots is printed, the web is advanced to locate an adjacent location of the web over the print head heating elements, and the selecting and heating process is repeated to print an adjacent line of dots on the web. This process is repeated in order to print complete lines of text or graphics on the web.

The heating elements of the print head which are selectively energized during the printing process are typically covered with a protective ceramic overcoat. Webs which are used to print images thereon also typically have thermally sensitive coatings. During printing, the web moves across the print head; hence, the coatings on the web and print head rub against each other. The rubbing of the web on the print head during printing causes abrasion of the overcoat on the print head, and this is a common mode of failure and a limitation on print head life. Additionally, because the web contacts the print head, it has been required to use expensive print media, specifically print media with expensive coatings in order to limit the wear on the print head.

In some printing applications, reactive components or metallic ions are used to produce an image on the thermally sensitive coating on the web. This causes the print head to be exposed to the reactive components or metallic ions. Unfortunately, the reactive components which are used in some printing applications can be corrosive to the print head. Additionally, the print head can become contaminated as a result of being exposed to metallic ions.

Because the print head of a thermal printer is subject to so much wear and exposure during the printing process, the print head is often considered to be an expendable maintenance item, despite the fact that the print head is relatively costly.

Thermal transfer printers are also well known in the prior art. In these printers, a nonsensitized web is customarily used and a transfer ribbon is interposed between the print head and the web having a coating of wax or resin which is selectively melted and thereby transferred to or chemically reacted with the web. This allows nonsensitized webs to be imaged and provides for a wide range of materials that can be used to form the image. The transfer ribbon can similarly expose the print head to reactive components or metallic ions, resulting in reduced print head life unless expensive back coatings are applied to the transfer ribbon to reduce the wear.

While the preferred embodiment is disclosed in terms of a direct thermal printer, the subject invention is equally adapted to thermal transfer printers, in which case, the sacrificial member is disposed between the print head and the transfer ribbon.

OBJECTS AND SUMMARY

A general object of an embodiment of the present invention is to provide a thermal printer that positions a sacrificial member between a print head and the web in order to reduce wear on the print head.

Another object of an embodiment of the present invention is to sacrifice a sacrificial member, such as a belt or web of thermally conductive material, in lieu of or in addition to the print head overcoat by interposing the sacrificial member between the web and the print head.

Briefly, and in accordance with at least one of the foregoing objects, an embodiment of the present invention provides a thermal printer that includes a sacrificial member disposed between the thermal print head and the web. The thermal printer holds the sacrificial member generally under tension, and the sacrificial member contacts the thermal print head and generally prevents the web from directly engaging the thermal print head.

Preferably, the thermal printer includes a platen roller, and the sacrificial member and web are disposed between the thermal print head and the platen roller, however, it should be noted that thermal and thermal transfer printing can be applied to webs that are held against the print head by web tension alone, that the claimed sacrificial member can be used with such structures, and that such structures are intended to lie within the scope of the appended claims. It should also be noted that the preferred embodiment is disclosed in terms of belt drives from a common motor, but that equivalent structures having gear drives or independent motors and drives for the web and the sacrificial member are intended to lie within the scope of the appended claims.

The sacrificial member may take one of many different forms. Regardless of the form the sacrificial member takes, by providing a sacrificial member between the print head and web, wear and exposure of the print head is reduced, thereby prolonging the life of the print head.

The thermal printer may take the form of a thermal transfer printer, in which case a thermal transfer ribbon is disposed between the sacrificial member and the web.

Another embodiment of the present invention provides a method of thermal printing wherein the steps include interposing a sacrificial member between a thermal print head and a web, and energizing the thermal print head to heat the web through the sacrificial member.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
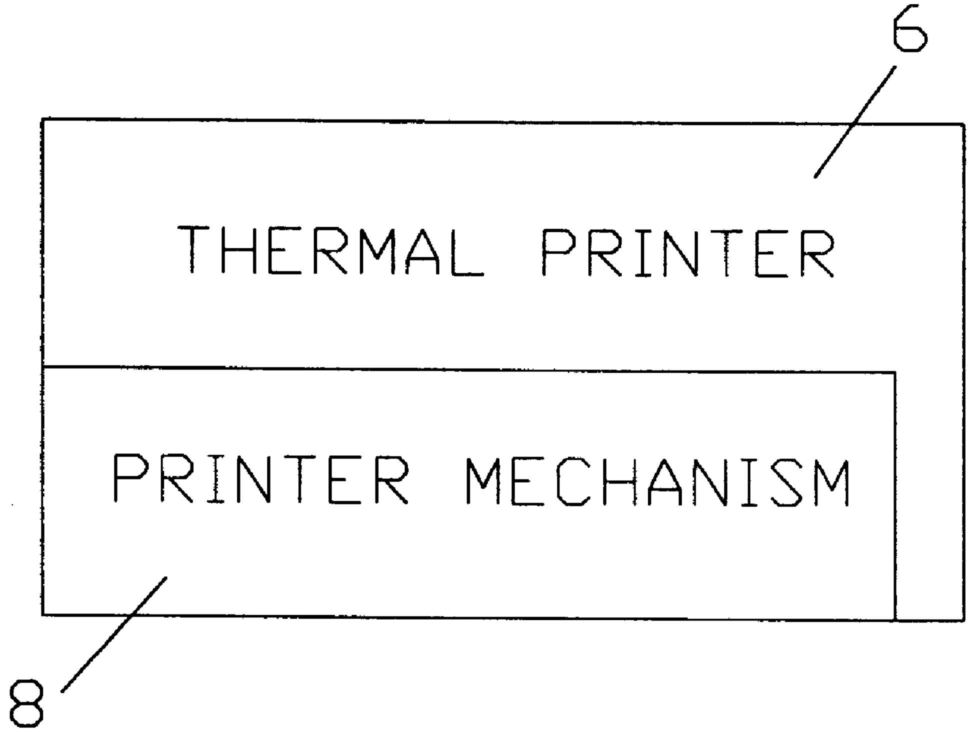
FIG. 1 is a simplified schematic view of a thermal printer which is in accordance with the present invention, where the thermal printer includes a printer mechanism which is in accordance with any one of FIGS. 2–6.

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

FIG. 1 provides a simplified schematic of a thermal printer 6 which is in accordance with the present invention. The thermal printer includes a printer mechanism 8 which corresponds to any one of FIGS. 2–6. In other words, FIGS. 2–6 show five different printer mechanisms which may be employed with the thermal printer shown in FIG. 1.

Each of the printer mechanisms shown in FIGS. 2–6 provide that a sacrificial member is employed between a thermal print head and a web in a thermal printer in order to reduce wear of the print head during printing. Since the cost of the sacrificial member and the labor to replace it are far less than the cost of replacing the print head, the result is a significant reduction in printing cost. Additionally, because the print head does not directly engage the web, less expensive print media can be used without causing excessive wear to the print head.

The printer mechanism shown in FIG. 2 will be described first, and then the printer mechanisms illustrated in the other FIGURES will be described emphasizing the differences. Because the different printer mechanisms have many similarities, like reference numerals are used to identify like parts.

Figure 2:
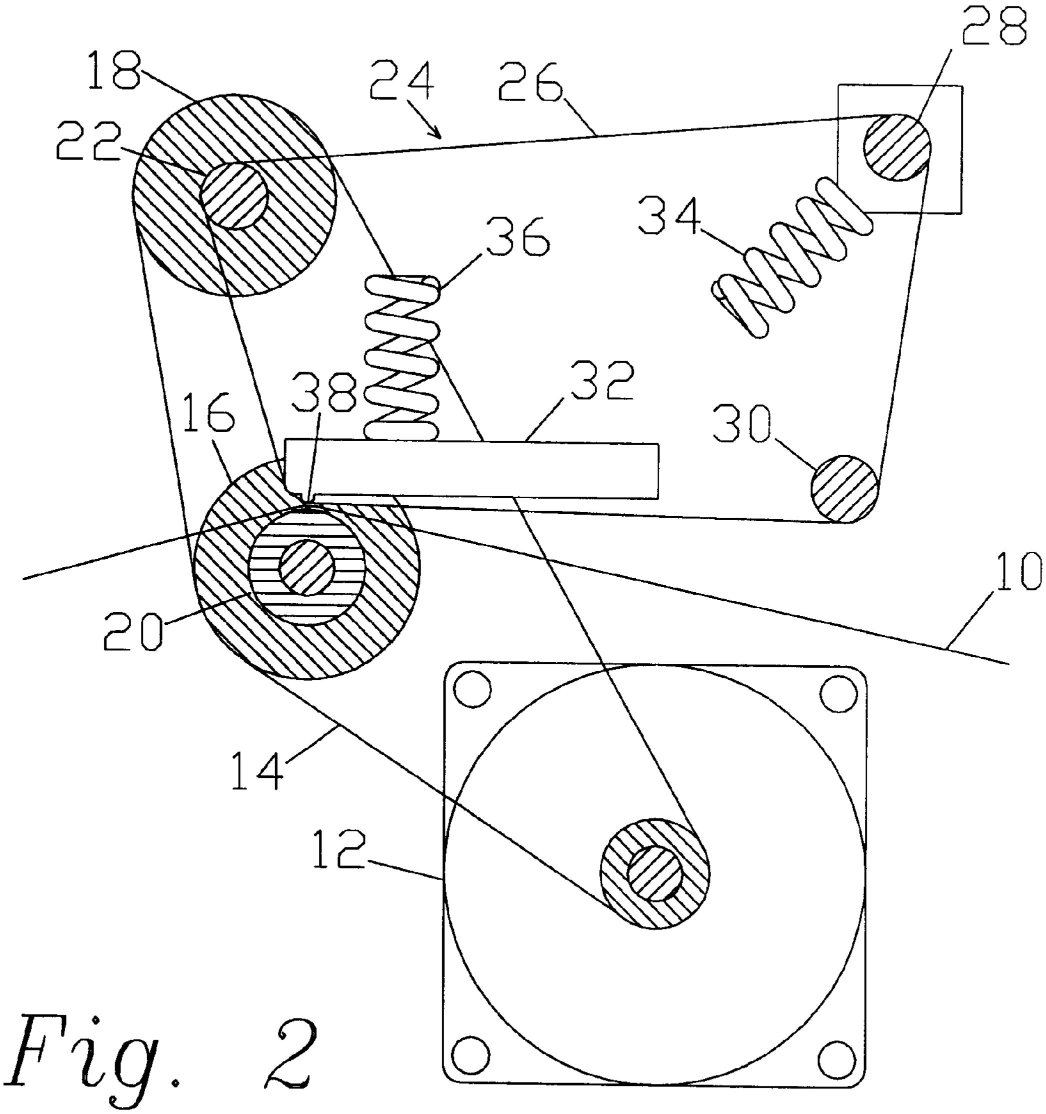
FIG. 2 is a side orthogonal view of a printer mechanism which includes a continuous, recirculating belt disposed between a thermal print head and a web.

FIG. 2 shows a printer mechanism which is intended for printing on a web 10 of thermally sensitized material. The printer includes a stepper motor 12 which drives a drive belt 14. The drive belt 14 is engaged with pulleys 16 and 18. Pulley 16 is connected to a platen roller 20 such that the stepper motor 12 uses the drive belt 14 and pulley 16 to drive the platen roller 20 in order to advance the web 10 during printing.

Pulley 18, with which the drive belt 14 is also engaged, is connected a drive roller 22. The drive roller 22 is engaged with a sacrificial member 24. As shown, the sacrificial member 24 may be a continuous, relatively smooth belt 26 which is held in tension by the driver roller 22 as well as idle rollers 28 and 30 and a print head 32. As shown, idle roller 28 is preferably engaged by a spring 34, and the print head 32 is also engaged by a spring 36.

The print head 32 includes a nip 38 at which printing occurs, and the nip 38 of the print head 32 is engaged with the belt 26. The print head 32 preferably is a thermal print head and includes heating elements which can be selectively energized during the printing process in order to print onto the web 10. The print head 32 also may include a protective overcoating, such as a ceramic overcoating.

The belt 26, i.e. sacrificial member 24, is preferably a continuous, smooth, thermally conductive material such as polyester, polyamide, or polyimide, e.g. Kapton™. Alternatively, the belt 26 may consist of a less costly material such as polyethylene terephthalate (PTE) if suitably thin. The belt 26 may consist of an unpigmented (i.e. uninked) ribbon with a heavy backcoat, in which case it is possible to use print media which does not include coatings that limit wear on the print head. In other words, less expensive print media can used due to the fact that the web 10 no longer directly contacts the print head 32 during printing.

As shown in FIG. 2, the belt 26 is held under tension by the nip 38 of the print head 32 (acting under pressure of spring 36), drive roller 22, idler roller 28 (acting under pressure of spring 34), and idler roller 30. The belt 26 is rotatable about the rollers 22, 28, 30 and print head 32 such that, during printing, the belt 26 recirculates, thereby wearing generally evenly about the entire surface of the belt 26. Preferably, the diameters of the drive roller 22 and pulley 18 effectively work as a velocity differentiator and provide that the belt 26 moves much slower than the web 10 during printing, such as one tenth as fast. This prolongs the life of the belt 26.

As an alternative to that which is shown in FIG. 2, a slack sacrificial belt can be used as the sacrificial member 24. In which case, a pinch roller would be added proximate the drive roller 22, or a pinch roller and brake would be added proximate idler roller 30.

Still further, the printer can be configured such that the user must periodically, manually advance the belt 26, as opposed to the belt 26 automatically advancing as the web 10 advances during printing. Alternatively, control of recirculation of the belt 26 may be foregone at the expense of belt life, in which case the belt 26 need not be actively driven (in other words, the belt 26 need not engage a drive roller, and instead may be engaged with only idler rollers and the print head).

In use, the stepper motor 12 dives drive belt 14 which is engaged with pulley 16. This, in turn, drives platen roller 20 which works to advance the web 10. When the drive belt 14 is driven, pulley 18 rotates, causing drive roller 22 to be driven. This causes the sacrificial belt 26 to circulate. The thermal print head 32 is selectively energized to heat the web 10 through the sacrificial belt 26, thereby causing printing on the web 10.

Figure 3:
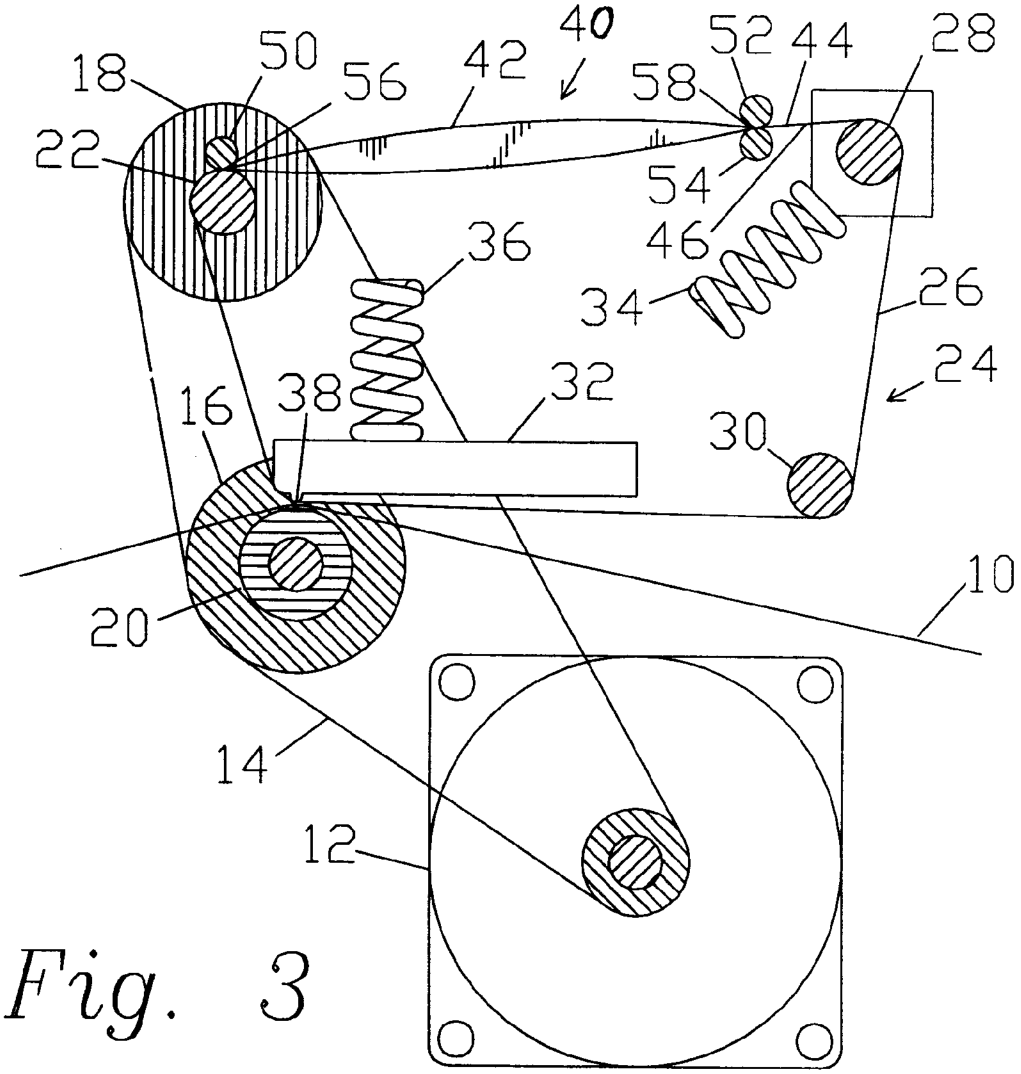
FIG. 3 is a side orthogonal view of a printer mechanism which includes a continuous, recirculating belt that includes a Moebius loop.

As discussed above, the printer mechanism shown in FIG. 2 provides that the belt 26 recirculates during printing, thereby causing the belt 26 to wear generally evenly about the entire surface of the belt 26. To further distribute the wear on the belt, the belt may be provided with a Moebius loop 40 as shown in FIG. 3. The Moebius loop 40 is provided by a twisted section 42 of the belt 26, and the Moebius loop 40 provides that the belt 26 wears evenly on both sides 44, 46. As shown in FIG. 3, three pinch rollers 50, 52, 54 can be provided to engage the twisted section 42 of the belt 26. The twisted section 42 is constrained between a first nip 56 formed between drive roller 22 and pinch roller 50, and a second nip 58 formed between second pinch roller 52 and third pinch roller 54.

Figure 4:
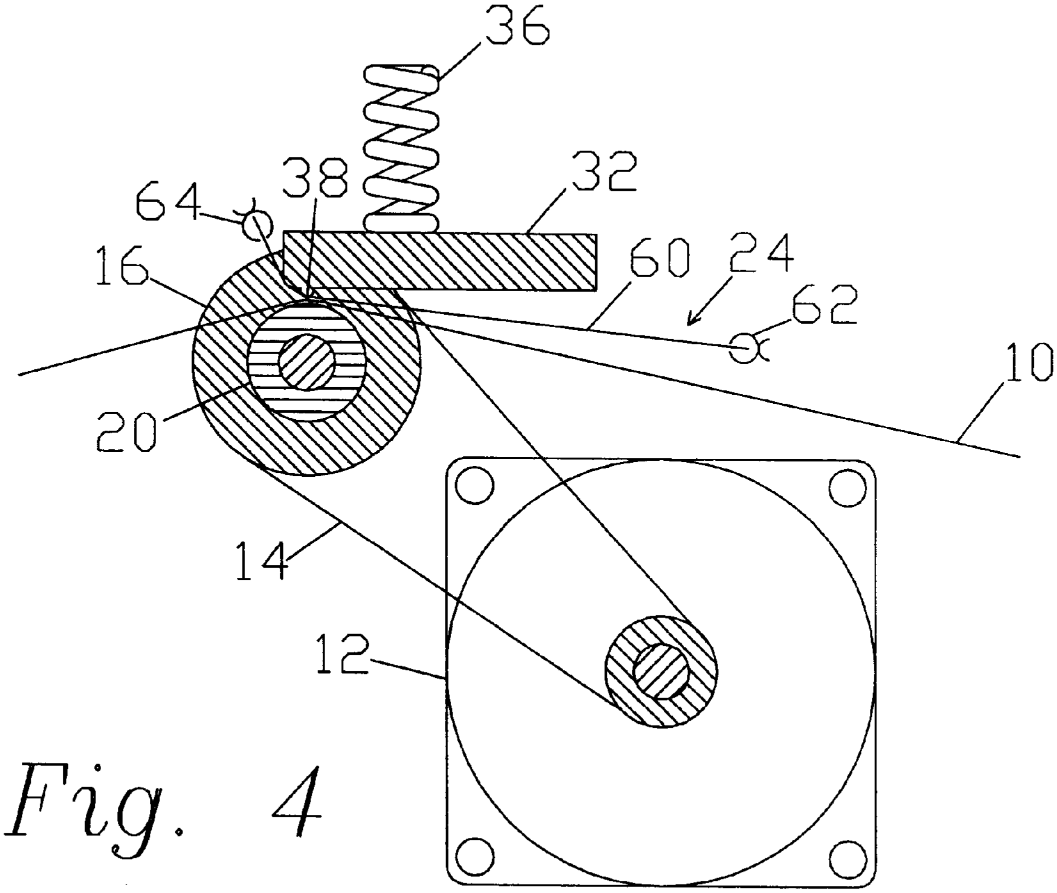
FIG. 4 is a side orthogonal view of a printer mechanism which includes a fixed belt or strip that is disposed between a thermal print head and a web.

FIG. 4 shows an alternative embodiment wherein instead of the sacrificial member 24 comprising a recirculating belt, the sacrificial member 24 consists of a generally non-circulating belt or strip 60 (i.e. a fixed web) which is removably retained by a first spring clip 62 and a second spring clip 64. The spring clips 62, 64 serve to keep the belt or strip 60 from moving substantially with the web 10 in either direction during printing, yet allow the belt or strip 60 to be replaced or repositioned. Because the belt 60 does not generally move during the printing process, the ability of the belt 60 to resist thermal deformation is important. Therefore, preferably, the belt or strip 60 consists of a material which is highly resistant to thermal deformation, such as Kapton™ polyimide.

Figure 5:
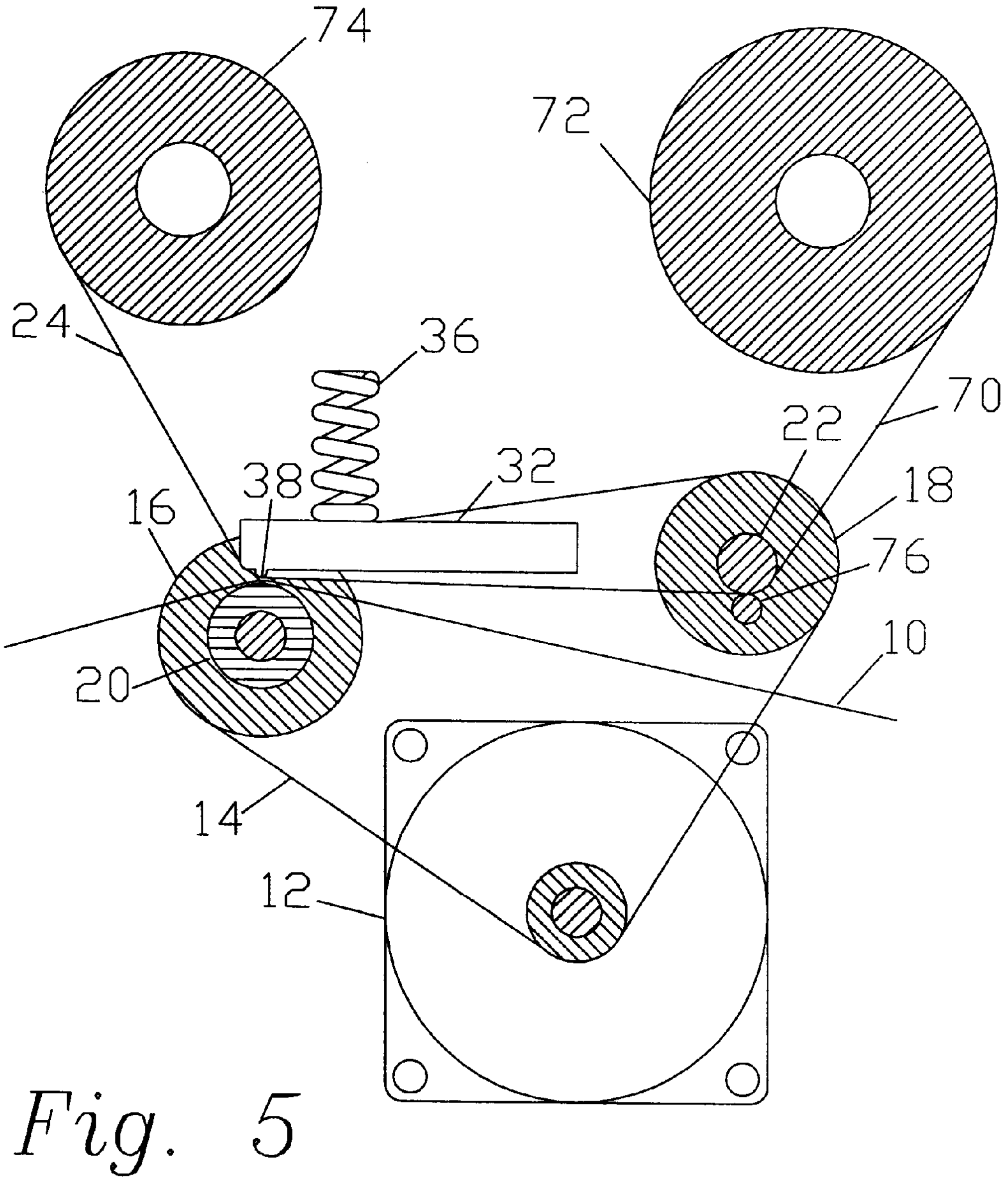
FIG. 5 is a side orthogonal view of a printer mechanism which includes a sacrificial member which is fed from a supply roll to a take-up roll.

FIG. 5 shows still another embodiment wherein the sacrificial member 24 does not circulate endlessly, nor is fixed, but rather comprises a ribbon 70 which is fed from a supply roll 72 to a take-up roll 74. Preferably, the ribbon 70 is unpigmented (i.e. uninked) with a heavy backcoat, in which case it is possible to use print media which does not include coatings that limit wear on the print head. As shown, the ribbon 70 contacts, and is generally held in tension by, the print head 32 and roller 22 (and pinch roller 76).

The difference in diameters between the roller 22 and pulley 18 provides that the ribbon 70 moves slower than does the web 10 during printing. As such, the roller 22 and pulley 18 together effectively act as a velocity differentiator with respect to the ribbon 70 and web 10. Providing that the ribbon 70 moves slower than the web 10 provides that the ribbon 70 need not be replaced as often.

Figure 6:
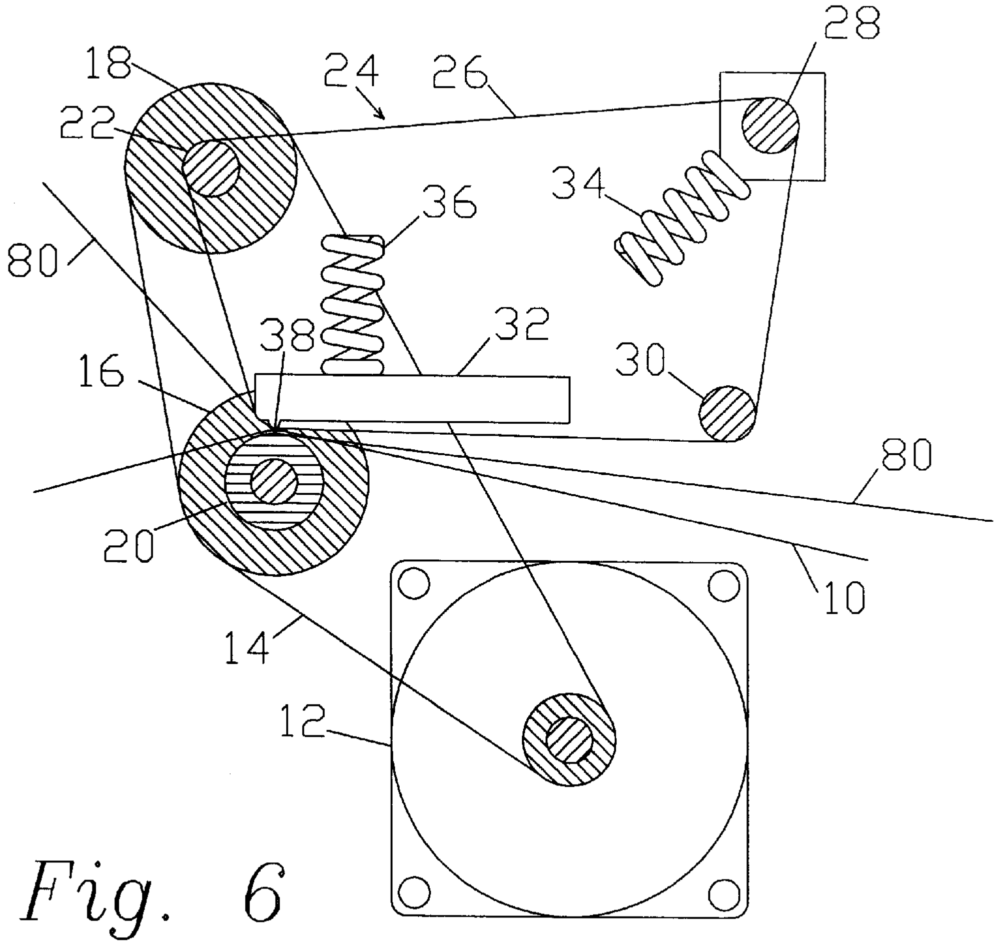
FIG. 6 is a side orthogonal view of a printer mechanism for use in a thermal transfer printer, wherein the printer mechanism includes a thermal transfer ribbon disposed between a sacrificial member and a web.

FIG. 6 shows yet another printer mechanism, and is configured to be employed when the thermal printer (see FIG. 1) is a thermal transfer printer. As shown in FIG. 6, such case provides that a thermal transfer ribbon 80 is disposed between the sacrificial member 24 and the web 10. While FIG. 6 is otherwise identical to FIG. 2 and shows that the sacrificial member consist of a circulating belt 26, the sacrificial member 24 used in a thermal transfer printer may take any of the other forms identified herein (i.e. may include a Moebius loop 40 as shown in FIG. 3, may be a fixed belt or strip 60 as shown in FIG. 4, or may be fed from a supply roll to a take-up roll as shown in FIG. 5).

With regard to the material chosen to comprise the sacrificial member, preferably in the embodiment shown in FIG. 4, the sacrificial member consists of Kapton™ polyimide, as Kapton™ polyimide is highly resistant to thermal deformation, and resistance to thermal deformation is important in the case where the sacrificial member is fixed. In the other embodiments (i.e. shown in FIGS. 2, 3, 5 and 6), the sacrificial member moves during the printing process, hence thermal deformation is not as much of an issue. Hence, less costly materials can be used for the sacrificial member.

Regardless of the specific embodiment employed, using a sacrificial member between a thermal print head and a web in a thermal printer reduces wear of the print head during printing, reduces overall printing cost, and provides that less expensive print media can be used without causing excessive wear to the print head.

While embodiments of the present invention are shown and described, it is envisioned that those skilled in the art may devise various modifications of the present invention without departing from the spirit and scope of the appended claims.

What is claimed is:

1. A thermal web printer comprising:

a thermal print head; and a Moebius-configured sacrificial member disposed between said thermal print head and a web passing said print head.

2. For use with a thermal web printer having a thermal print head, the method comprising:

moving a print web past the print head; and circulating an endless sacrificial member between the thermal print head and the web.

3. The method as recited in claim 2, wherein the endless sacrificial member is Moebius-configured.

4. A thermal printer configured to receive a web and print thereon, said thermal printer comprising:

a thermal print head; and a sacrificial member disposed between said thermal print head and said web when said web is received by said thermal printer, wherein said sacrificial member comprises a belt, wherein said belt comprises an unpigmented ribbon and wherein said web is not coated.

5. The thermal printer as recited in claim 4, further comprising a velocity differentiator acting on said web and said sacrificial member.

6. The thermal printer as recited in claim 5, wherein said velocity differentiator is configured to drive said sacrificial member at a rate slower than said web.

7. The thermal printer as recited in claim 4, wherein said sacrificial member contacts said thermal print head and generally prevents said web from directly engaging said thermal print head.

8. The thermal printer as recited in claim 4, wherein said thermal printer is configured to hold said sacrificial member generally under tension.

9. The thermal printer as recited in claim 4, said thermal printer further comprising a platen roller, wherein said sacrificial member is disposed between said thermal print head and said platen roller.

10. The thermal printer as recited in claim 4, wherein said sacrificial member is in contact with said print head, and said print head holds said sacrificial member in tension.

11. The thermal printer as recited in claim 4, wherein said belt is at least one of fixed and rotatable.

12. The thermal printer as recited in claim 11, wherein said belt is rotatable, continuous, and is supported by at least one roller in addition to the thermal print head.

13. The thermal printer as recited in claim 11, wherein said belt is rotatable, continuous, and is supported by a plurality of idler rollers and at least one drive roller in addition to the thermal print head.

14. The thermal printer as recited in claim 11, wherein said belt is rotatable and continuous, said thermal printer is configured to move said web during printing and is configured to move said belt at a speed which is slower than said web moves during printing.

15. The thermal printer as recited in claim 11, wherein said belt is rotatable, continuous, and includes a Moebius loop.

16. The thermal printer as recited in claim 4, further comprising a roller which is configured to engage the web when the web is received by said thermal printer, and a second roller engaged with said sacrificial member.

17. A thermal printer configured to receive a web and print thereon, said thermal printer comprising:

a thermal print head; and a sacrificial member disposed between said thermal print head and said web when said web is received by said thermal printer, wherein said sacrificial member comprises a belt, wherein said belt is at least one of fixed and rotatable, wherein said belt is rotatable, continuous, and includes a Moebius loop.

18. The thermal printer as recited in claim 17, further comprising a plurality of pinch rollers which engage said sacrificial member and maintain said Moebius loop.

19. A thermal printer configured to receive a web and print thereon, said thermal printer comprising;

a thermal print head; and a sacrificial member disposed between said thermal print head and said web when said web is received by said thermal printer, wherein said sacrificial member contacts said thermal print head and generally prevents said web from directly engaging said thermal print head, wherein said thermal printer is configured to hold said sacrificial member generally under tension, said thermal printer further comprising a platen roller, wherein said sacrificial member is disposed between said thermal print head and said platen roller, wherein said sacrificial member comprises a belt, wherein said belt is rotatable, continuous, and is supported by a plurality of idler rollers and at least one drive roller in addition to the thermal print head, wherein said is configured to move said web during printing and is configured to move said belt at a speed which is slower than said web moves during printing, further comprising a roller which is configured to engage the web when the web is received by said thermal printer, and a second roller engaged with said sacrificial member, wherein said belt includes a Moebius loop, further comprising a plurality of pinch rollers which engage said sacrificial member and maintain said Moebius loop.

20. For use with a thermal web printer, a print mechanism comprising:

a thermal print head; and a sacrificial member disposed in contact with said thermal print head, wherein said sacrificial member is configured as an endless loop.

21. The print mechanism as recited in claim 20, wherein said sacrificial member has a Moebius configuration.

22. The print mechanism as recited in claim 20, wherein said sacrificial member is an inkless thermal transfer ribbon.

23. The print mechanism as recited in claim 20, further comprising a print web and thermal transfer ribbon between said web and said sacrificial member.

24. For use with a thermal web printer having a thermal print head, a consumable in the form of a sacrificial member adapted to be located between the print head and a web, wherein said sacrificial member is configured as an endless loop.

25. The consumable as recited in claim 24, wherein said sacrificial member has a Moebius configuration.

26. The consumable as recited in claim 24, wherein said sacrificial member is an inkless thermal transfer ribbon.

27. A thermal printer comprising a web of thermally sensitized material, a thermal print head, and a sacrificial member disposed between said thermal print head and said web of thermally sensitized material.

* * * * *

UNITED STATES PATENT AND TRADEMARK OFFICE
CERTIFICATE OF CORRECTION

PATENT NO. : 6,583,803 B2
DATED : June 24, 2003
INVENTOR(S) : David L. Poole et al.

It is certified that error appears in the above-identified patent and that said Letters Patent is hereby corrected as shown below:

Title page,
Item [73], Assignee: "Zih Corporation" should be -- ZIH Corp. --

Signed and Sealed this

Ninth Day of September, 2003

JAMES E. ROGAN
*Director of the United States Patent and Trademark Office*